(12) United States Patent
Love, Jr.

(10) Patent No.: US 6,513,378 B1
(45) Date of Patent: Feb. 4, 2003

(54) LIQUID LEVEL FLOAT SWITCH WITH MANUAL RESET

(76) Inventor: H. Worth Love, Jr., 2501 Howerton Ct., Charlotte, NC (US) 28270

( * ) Notice: Subject to any disclaimer, the term of this patent is extended or adjusted under 35 U.S.C. 154(b) by 0 days.

(21) Appl. No.: 10/080,723

(22) Filed: Feb. 22, 2002

Related U.S. Application Data

(60) Provisional application No. 60/276,403, filed on Mar. 16, 2001.

(51) Int. Cl.[7] .............................................. G01F 23/60
(52) U.S. Cl. ...................... 73/313; 73/322.5; 340/623; 340/624
(58) Field of Search ............................... 73/313, 322.5; 340/623, 624; 200/840

(56) References Cited

U.S. PATENT DOCUMENTS

| | | | | |
|---|---|---|---|---|
| 3,227,838 A | * | 1/1966 | Hoeppel | 335/153 |
| 4,064,755 A | * | 12/1977 | Bongort et al. | 73/313 |
| 4,384,184 A | * | 5/1983 | Alvarez | 200/84 C |
| 4,537,070 A | * | 8/1985 | Milish | 73/313 |
| 5,262,604 A | * | 11/1993 | Powell | 200/84 C |
| 5,299,456 A | * | 4/1994 | Steiner | 73/308 |
| 6,035,699 A | | 3/2000 | Parlante | |
| 6,195,013 B1 | | 2/2001 | Robinson | |
| 6,218,949 B1 | | 4/2001 | Issachar | |
| 6,253,610 B1 | | 7/2001 | Struzik et al. | |
| 6,289,728 B1 | * | 9/2001 | Wilkins | 73/149 |

* cited by examiner

Primary Examiner—Daniel S. Larkin
Assistant Examiner—André K. Jackson
(74) Attorney, Agent, or Firm—Dougherty, Clements & Hofer

(57) ABSTRACT

An electro-mechanical liquid level float switch that continuously actuates a switch on sensing a change in the liquid upon reaching a threshold level, where the float-switch requires manual reset once the switch has been actuated. The float switch has an elongated stem with a reed switch embedded in one end of the stem, and a float with a magnetic portion. The float is constrained to move between a stop below the switch and an upper stop above the switch. When the float is abutted against the upper stop, it is aligned with the switch. Once aligned with the switch, the switch is actuated. The float is held is alignment with the switch by a magnet located in the upper stop, where the magnet can support the weight of the float. Once the switch is actuated it remains actuated, unless the float is physically separated from the magnet.

10 Claims, 4 Drawing Sheets

LIQUID LEVEL FLOAT SWITCH WITH MANUAL RESET

CROSS REFERENCE TO RELATED APPLICATION

This application claims the benefit of U.S. Provisional Application, Serial. No. 60/276,403, filed Mar. 16, 2001.

FIELD OF THE INVENTION

The invention relates to an electro-mechanical switch which is opened or closed when exposed to a magnetic field. More specifically, the invention relates to a liquid level float switch in which the water level of a container determines the position of a magnet and the location of the magnet determines whether the magnetically actuated switch is opened or closed.

BACKGROUND OF THE INVENTION

A float switch is an electro-mechanical device which allows for an electrical switch to be opened or closed depending on the fluid level in a container. The float switch allows for automatic operation of devices depending on the level of fluid, such as the operation of pumps, or the opening or closing of valves.

Float switches are common in industry and in the prior art. Most float switches contain an electrical switch imbedded within the body of the float switch device. The electrical switch is actuated upon physical movement of the portion of the float switch device containing the electrical switch or upon physical movement of another portion of the float switch device. Many prior art float switches contain a mechanical actuator. For example, a mechanical switch may be embedded within a stem. The float may be fixably attached to a container wall or structure within a container in such manner that the float hangs upside down when the water level within the container is low. When the water level within the container rises, the float is raised into an upright position with respect to its fixed location within the container, and the mechanical connection within the float opens or closes an electrical switch.

Another common type of water level switch is a magnetically actuated switch imbedded into an elongated tube. The elongated tube has a buoyant float moveably surrounding the tube with a metallic or magnetic component such that the float may move up or down along the length of the tube as the water level within a container rises or lowers. When the metallic or magnetic component of the float is raised or lowered to correspond with the position of the magnetic switch within the elongated tube, the switch within the tube is magnetically actuated and the electrical circuit is opened or closed.

Liquid level switches are often used as safety devices within liquid containing tanks or vessels. For instance, it is important to maintain a proper water level within a heating vessel such that heating elements do not overheat when there is an inadequate supply of water or other fluid to the tank or in the event that there is a leak in the tank. In such a situation it is important that a safety sensor or switch be available to disconnect the heating elements in the event of a fluid heating situation or discontinue liquid flow to a container in a leaking vessel situation.

Applicant is aware of the following U.S. Patents concerning electro-mechanical liquid level switches/sensors.

Struzik et al., U.S. Pat. No. 6,253,610, teaches a wiper for use in a system for monitoring fluid level in a container. The wiper is equipped with a body portion, a first and second lengthwise end, a first and second side, and a pair of contact members electrically connected to one another.

Robinson, U.S. Pat. No. 6,195,013, teaches a float sensor having a mounting bracket which incorporates an O-ring seal and mounting fingers which locks the mounting bracket to a tank flange. A reed switch housing is welded to the end of the tube opposite the mounting bracket.

Issachar, U.S. Pat. No. 6,218,949, teaches a liquid level apparatus which generates an alarm signal, discontinuing an operation such as heating, when the liquid in a controlled vessel has reached a predetermined level. The operation of the apparatus may be based on various physical properties, such as magnetic, acoustic or electrical properties.

The prior art liquid level switches have the disadvantage of not having means of indicating whether the switch had been previously operated or not. This is often the case in a slow leaking vessel which, because of its slow leaking, cycles between a high liquid level and a low liquid level status. In such a case the leaking of the vessel would not be immediately obvious to one only intermittently observing the status of the circuit controlled by the liquid level switch. Similarly, liquid level switches of the prior art would allow repeated connection and disconnection of heating elements or other devices in the event of a cycling liquid level. Additional sensors may be added to the prior art liquid level switches to indicate the previous operational history of the switches, however, these added components detract from the reliability of the switches, especially in harsh working environments.

OBJECTS OF THE INVENTION

The principal object of this invention is to provide a liquid level float switch that must be manually reset once activated.

Another object of this invention is to provide a liquid level float switch which stays in the activated position after initial activation regardless of future changes in liquid level within a container.

SUMMARY OF THE INVENTION

The invention is a float-switch that automatically actuates a switch continuously on sensing a change in a liquid above a threshold level, where said float-switch requires manual reset once the switch has been actuated. Manual reset is effected by moving the float-switch below the threshold level.

The invention is comprised of an elongated cylindrical stem having linear positions comprising: a lower sectional length with a lower stop, a non-actuation sectional length, a switch actuation sectional length, and an upper sectional length with an upper stop. A magnetically actuated switch, preferably a reed switch, along with its associated electrical connectors, is embedded in the stem, at a position adjacent to the upper stop. The magnetically actuated switch is located at the switch actuation sectional length, and the electrical connectors preferably extend through the stem exiting the upper sectional length.

A fixed magnet, immobilized by a fastening means to the stem, forms the upper stop of the stem, just above the magnetically actuated switch. A retaining clip, affixed to the stem, forms the lower stop. The retaining clip is most preferably a push nut. A float that is preferably cylindrical is mounted upon the stem between the fixed magnet and the retaining clip. The float has an annular wall defining a center hole through which the stem protrudes.

The float is free to move up and down the stem, and in a vertical orientation, the float responds to a liquid having a density greater than the overall density of the float. The float always seeks to move toward the surface of the liquid. The range of movement is confined to the length of stem defined on one end by the retainer clip, and on the other end by the permanent magnet.

The float contains a magnetic portion, where the magnetic portion is preferably a toroidal magnet with a core that is oriented to be magnetically attracted to the fixed magnet, where the stem moves through the core of the toroidal magnet. The toroidal magnet has a magnetic field at the core, wherein the magnetic field is sufficient to actuate the magnetic actuated switch. The magnetic portion is arranged in or on the float such that an upper face on the magnetic portion corresponds in shape to a lower face on the fixed magnet. When the float moves up the stem in response to a change in the liquid level, once it reaches the threshold level, which corresponds to the very near proximity of fixed magnet, the float is magnetically drawn to the fixed magnet. The force of attraction is sufficient to support the weight of the float, and the upper face of the magnetic portion is abutted to the lower face of the fixed magnet. The position of the float is fixed by the mutual magnetic attraction between the fixed magnet and the magnet portion of the float. The position of the float, abutting the fixed magnet, aligns the magnetic actuated switch in the core of the toroidal magnet, therein maintaining continuous actuation of the switch.

The switch can be de-actuated by manually moving the float down the stem toward the retainer clip, in the region of the stem displaced from the switch, which was previously identified as the non-actuation sectional length. While the float remains in this region of the stem the magnetic switch is not actuated. It therefore follows that so long as the level of liquid is below the threshold level of liquid, the magnetic switch will not be actuated.

In most magnetically actuated switches, and especially with regard to a reed switch, the nominal position when the switch is not actuated is where the contacts of the switch are open. A typical reed switch, sometimes called a reed relay, has ferromagnetic arms that, in the absence of a magnetic field, are parallel and not touching. In the presence of a magnetic field, the arms or reeds are brought into contact.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings in which.

DETAILED DESCRIPTION

The present invention will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will convey the scope of the invention fully to those skilled in the art. Like numbers refer to like elements throughout.

Figure 2:
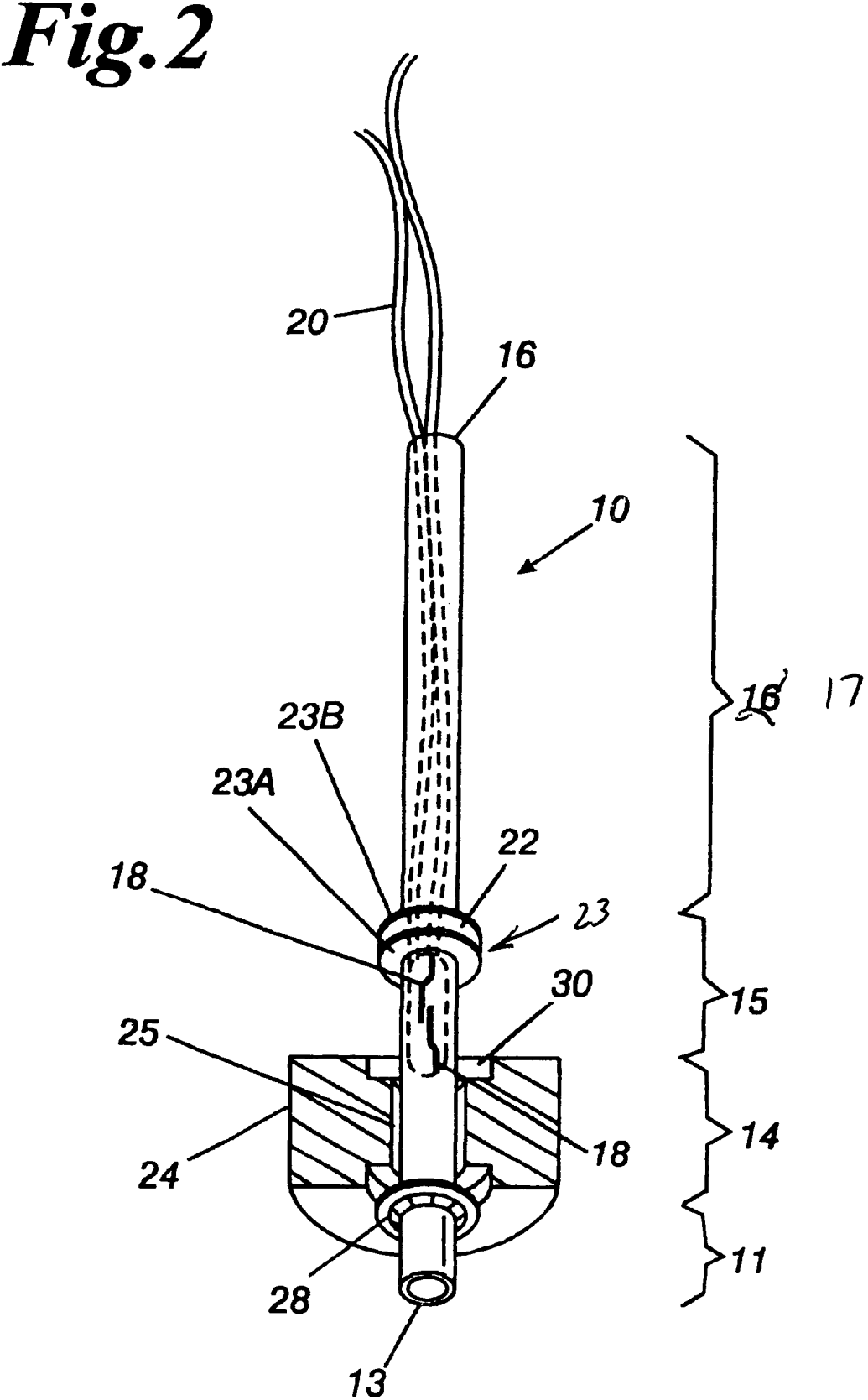
FIG. 2 is a partially cutaway view of the invented liquid level float switch wherein the magnetically actuated switch is not actuated.
Figure 3:
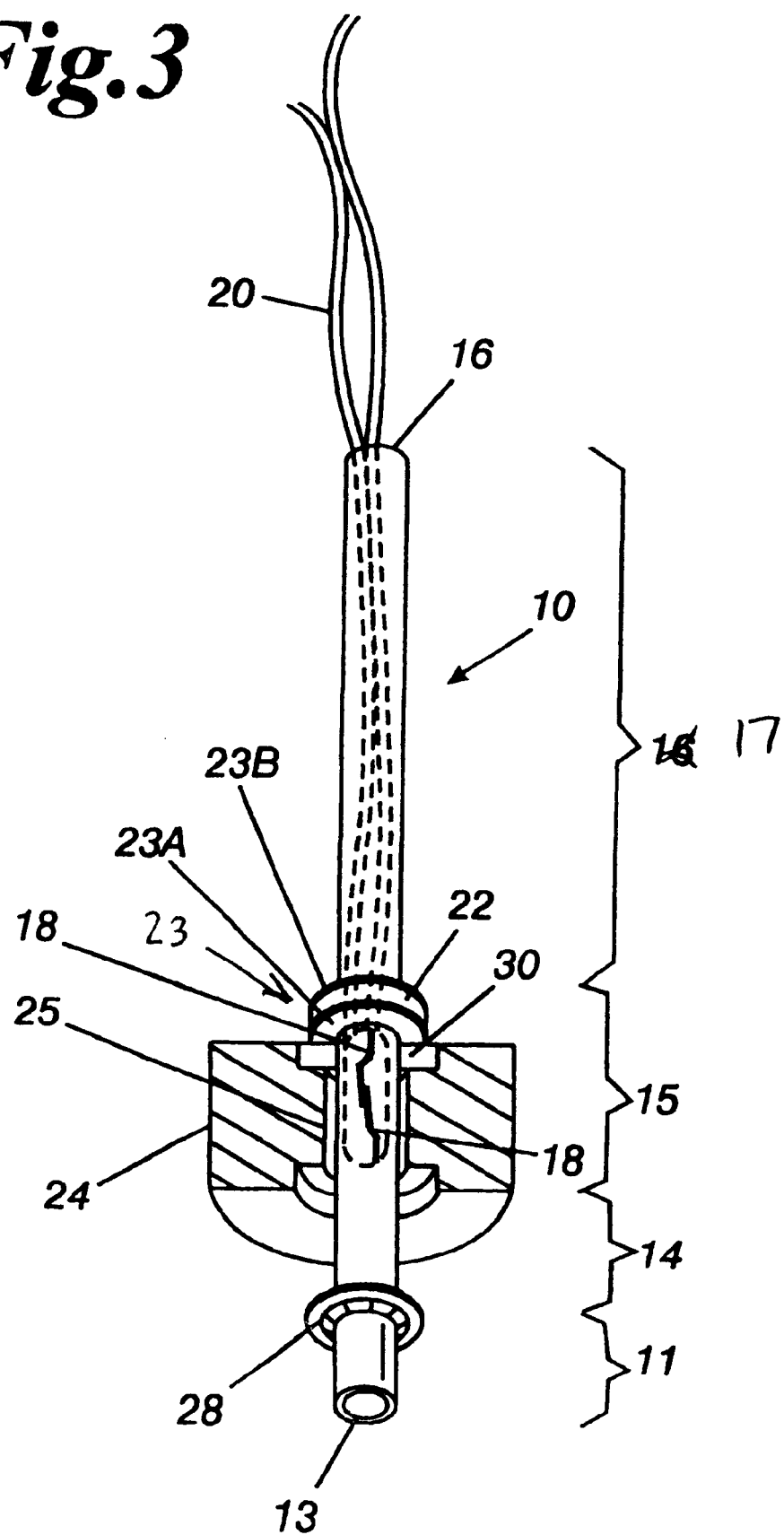
FIG. 3 is a partially cutaway view of the invented liquid level float switch wherein the magnetically actuated switch is actuated.

The invention 10 as shown in partially cutaway views FIG. 2 and FIG. 3, is comprised of an elongated hollow tubular stem 12 having linear positions comprising: a lower sectional length 11 with a lower stop 28 having a first end 13, a non-actuation sectional length 14, a switch actuation sectional length 15, and an upper sectional length 17 with an upper stop 23 having a second end 16. The upper stop 23 limits movement of a cylindrical float 24 along the stem 12. The illustrated upper stop 23 includes a fixed magnet 22 sandwiched between push nuts 23a and 23b. The lower push nut 23a is sufficient to serve as a stop, while the pair of push nuts 23a, 23b fix the magnet 22 in a predetermined position on the stem 12. A magnetically actuated switch 18 is embedded within the switch actuation sectional length 15. The attendant electrical connectors 20 lead to the switch 18 through the second end 16 of the upper sectional length 17 of the stem 12. In a preferred embodiment of the present invention, switch 18 is a reed switch which is imbedded in the stem 12 and welded to the second end 16 of the stem with the electrical connectors 20 extending outwardly therefrom.

Figure 1:
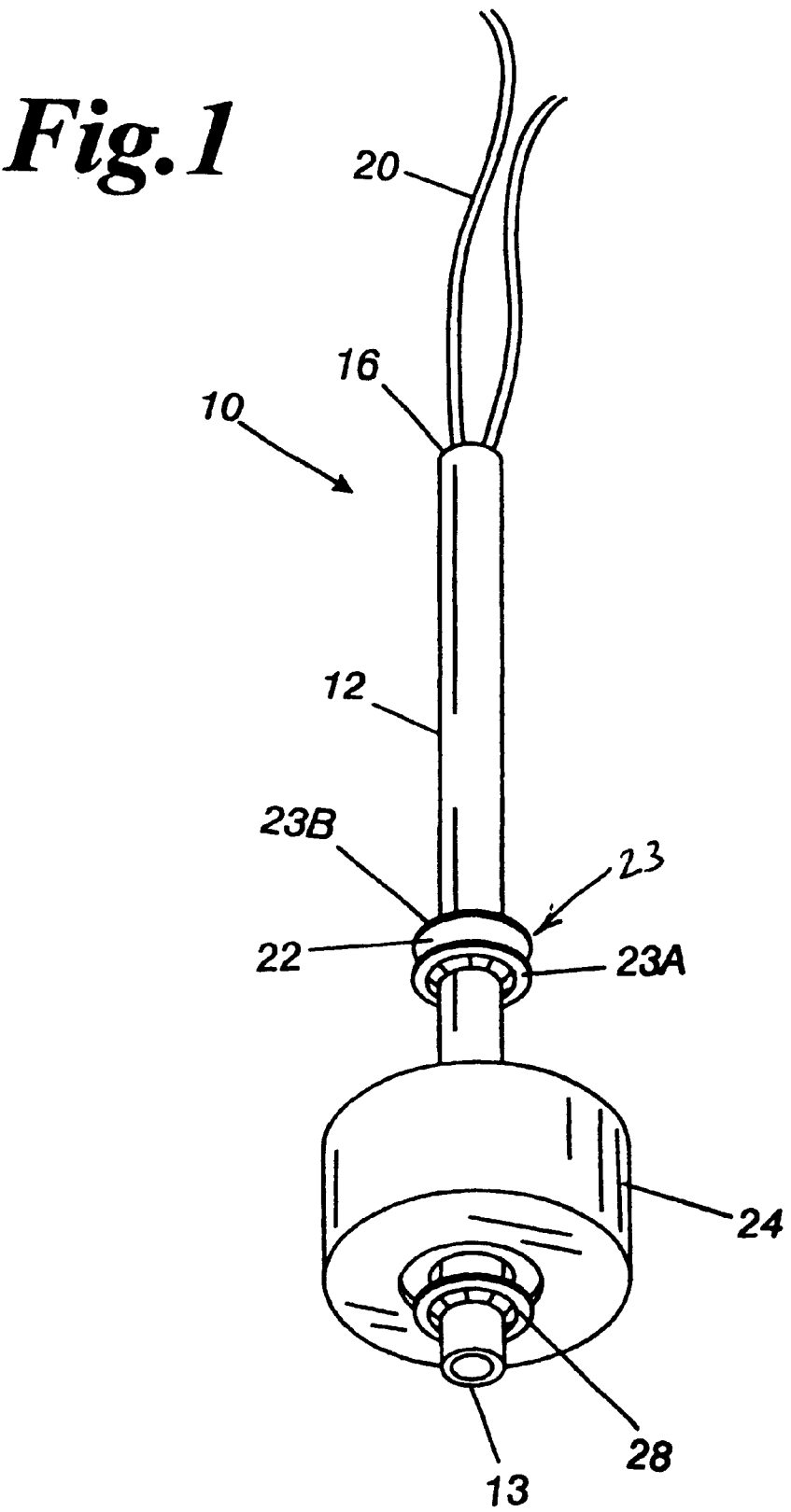
FIG. 1 is an isometric view of a preferred embodiment of the liquid level float switch of the present invention.

Referring now to FIG. 1, a fixed magnet 22 is attached to the stem 12 at the upper stop 23, sandwiched between push nuts 23a, 23b, just above the location of the embedded magnetically actuated switch 18. The cylindrical float 24 is slidably mounted upon the stem 12 below the fixed magnet 22. The float 24 has an inner annular wall 25 defining a center hole 26 as best viewed in FIG. 4, through which the stem 12 protrudes. The float 24 is prevented from sliding apart from stem 12 by the lower stop 28, which preferably is also a push nut, placed near the first end 13. Float 24 contains a magnet portion 30. The magnet portion 30 is arranged in or on float 24 such that magnet portion 30 corresponds in shape to fixed magnet 22 and fits flush against fixed magnet 22 as float 24 is moved upwardly on stem 12 so as to abut fixed magnet 22.

The invented liquid level float switch 10 is used by placing the first end 13 toward the liquid level or submerging within the liquid. The stem 12 is preferably placed perpendicular to the surface of the fluid/media within the container, though the float switch 10 may be used effectively at angles other than perpendicular to the surface, for example, the angle maybe 15 degrees off vertical. When the liquid level within the container rises, the float 24 rises upwardly along stem 12. As the liquid level continues to rise, the float 24 and magnet portion 30 of the float continue to rise until the float 24 corresponds to the location of the magnetically actuated switch 18. When the float 24 and magnetically activated switch 18 are in alignment, the magnet portion 30 of the float 24 actuates the magnetically actuated switch 18, which opens or closes the electrical device connected to electrical connectors 20. The magnetically actuated switch 18 is closed in the illustrated embodiment shown in FIG. 3. When float 24 rises to correspond to the position of the magnetically actuated switch 18, the magnet portion 30 of float 24 is magnetically held into position by fixed magnet 22. Because of the magnetic attraction between magnet portion 30 and fixed magnet 22 the magnetically actuated switch 18 is continuously actuated regardless of subsequent change in liquid level within the container. Once the magnet portion 30 and fixed magnet 22 are magnetically attached they will remain connected until manually separated. Thus, once liquid rises to a pre-specified threshold level within the container, the invented liquid level float switch 10 is actuated, and will remain actuated until reset manually.

FIG. 3 shows a partially cutaway view of the invented liquid level float switch wherein the magnetically actuated switch is actuated. Note the magnetically actuated switch 18 and the toroidal magnet 30 are aligned.

Figure 4:
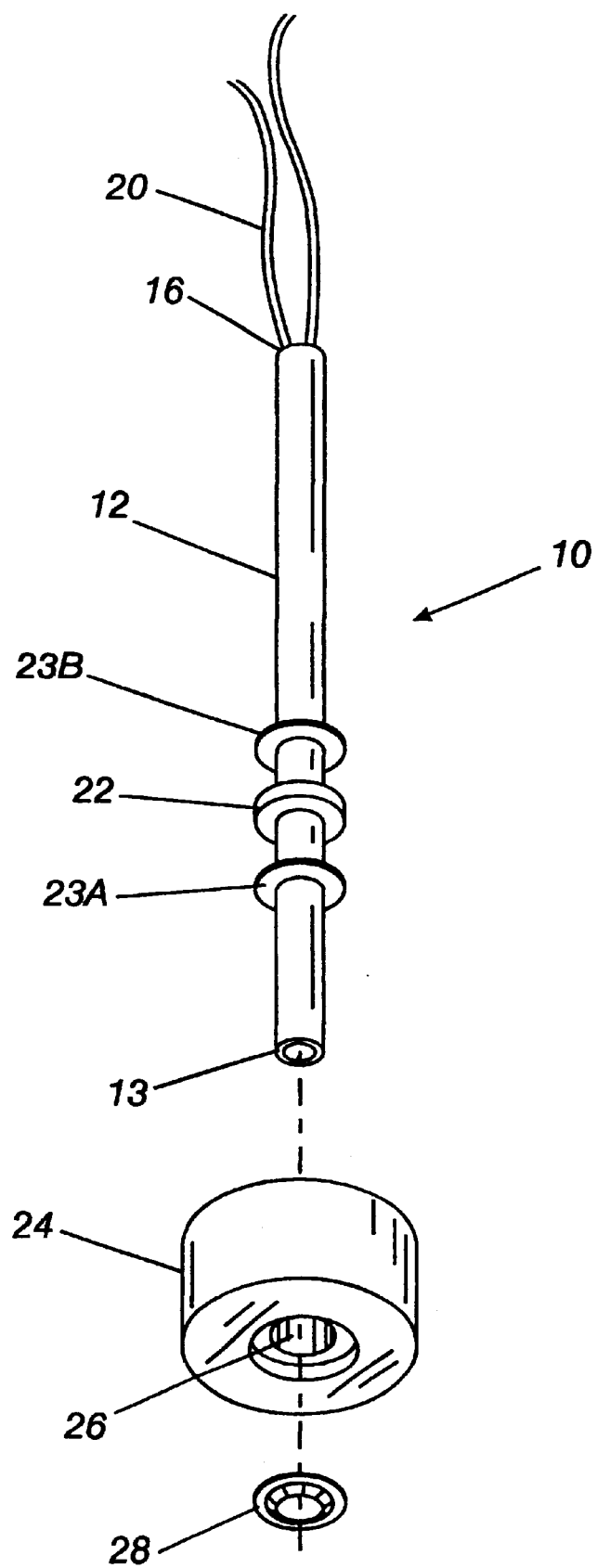
FIG. 4 is an exploded view of the present invention.

FIG. 4 shows an exploded view of the present invention. FIG. 4 is particularly interesting in that it illustrates the relative simplicity with which the float switch can be assembled.

Alternative Embodiments

Magnetically actuated switch 18 is preferably a reed switch, although it may be any mechanical, electrical, or electronic switch activated by exposure to a magnetic field. The switch 18 may be arranged so that it opens the connected circuit when exposed to the magnetic field or that it closes the connected circuit when exposed to a magnetic field.

The magnetically actuated switch 18 is connected to an electrical, mechanical, or electronic device by electrical connectors 20. Electrical connectors 20 may be lead wires, electrical fasteners, or any other type of electrical connector. Electrical connectors 20 will normally be two wire leads corresponding to the circuit controlled by switch 18, although there may be 3 or more electrical connections corresponding to 2 or more magnetically actuated switches found within the stem 12.

Both fixed magnet 22 and magnet portion 30 are described as being magnetic in the discussion above. The fixed magnet 22 need not be a magnet at all. Fixed magnet 22 need only be a iron compound or other material capable of attracting magnet portion 30 and holding magnet portion 30 in magnetic connection with fixed magnet 22 upon initial connection thereto.

Float 24 may be constructed of a solid light weight material or may be hollow and filled with air or other gas. The material and size of float 24 will be determined by the density of the fluid which is being measured. The material of float 24 and the rest of the liquid level float switch 10 will also be determined by the physical and/or corrosive properties of the liquid to be measured. Cellular materials such a closed cell foams of polyolefins are particularly adaptable. Other materials include polyurethanes, polystyrenes, pvc and polyacrylics. Blends of natural cellular materials, like cork, with polymeric materials are also suitable.

The shape of stem 12 is preferably cylindrical, though it may have any geometrical cross-section as long as the dimensions and circumference, if applicable, of stem 12 remain constant from first end 13 to second end 16. Similarly, the annular opening within float 24 may be any shape corresponding to the cross-sectional shape of stem 12.

The invented liquid level float 10 may be positioned within the liquid container such that the float 24 moves upward with increased liquid level until magnetically attaching to fixed magnet 22, or positioned within the liquid container such that float 24 moves down with decreased liquid level until magnetically attaching to fixed magnet 22, wherein the magnetic attraction between the float and the fixed magnet exceeds the lift due to floatation.

Summary of the Achievement of the Objects of the Invention

The foregoing discloses an improved liquid level float switch which may be utilized to indicate the raised or lowered level of liquid within a container. The invented switch, because of its simplistic design may be used to accurately and reliably indicate change in liquid level and to continuously indicate that liquid level has changed until the switch has manually reset.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A liquid level float switch that continuously actuates a switch on sensing a change in the liquid upon reaching a threshold level, wherein said float-switch requires manual reset once the switch has been actuated, where resetting the float-switch is effected by moving the float-switch below the threshold level, said switch comprising:

an elongated stem having linear positions comprised of a lower sectional length with a lower stop, a non-actuation sectional length, a switch actuation sectional length, and an upper sectional length with an upper stop;

a magnetically actuated switch embedded within said stem;

electrical connectors, connected to said magnetically actuated switch, and leading from said stem;

a float with a magnetic portion, slidably connected to said stem, such that said float may move slidably between said lower stop and said upper stop of said stem;

where there is sufficient magnetic attraction between the float and the upper stop to support the weight of the float;

where said magnetic portion is sufficient in magnetic force to continuously actuate the magnetically actuated switch; and wherein the magnetically actuated switch is reset by moving the float to the non-actuation sectional length of the stem.

2. A liquid level float switch according to claim 1, wherein said stem is a sealed tube in which are housed the magnetic actuated switch and the attendant electrical connectors.

3. A liquid level float switch according to claim 1, wherein said upper stop fixedly immobilizes a permanent magnet to the stem.

4. A liquid level float switch according to claim 1, wherein said float with a magnetic portion is a cylinder having an annular wall defining a center hole and a toroidal magnet, through which the stem protrudes.

5. A liquid level float switch according to claim 1, wherein said lower stop is a retainer clip or a push nut.

6. A liquid level float switch according to claim 1, wherein the magnetic actuated switch is a reed switch.

7. A liquid level float switch according to claim 3, wherein said permanent magnet is immobilized by sandwiching the permanent magnet between two push nuts.

8. A liquid level float switch according to claim 1, wherein the magnetic actuated switch is an electro-mechanical switch that is actuated by a magnet.

9. A liquid level float switch according to claim 1, where the switch has an inverse orientation, and as such is capable of sensing when a liquid level reaches a threshold low level, wherein the attractive force between the float and the permanent magnet exceeds the lift of the float, where if said liquid level rises submerging the float, the float remains in the switch actuation sectional length, and the magnetically activated switch remains actuated.

10. A liquid level float switch that continuously actuates a switch on sensing a change in the liquid upon reaching a threshold level, wherein said float-switch requires manual reset once the switch has been actuated, where resetting the float-switch is effected by moving the float-switch below the threshold level, said switch comprising:

an elongated stem having linear positions comprised of a lower sectional length with a lower stop, a non-actuation sectional length, a switch actuation sectional length, and an upper sectional length with an upper stop;

a magnetically actuated switch embedded within said stem;

electrical connectors, connected to said magnetically actuated switch, and protruding from an end of said stem;

a float with a magnetic portion, slidably connected to said stem, such that said float may move slidably between said lower stop and said upper stop of said stem;

where said upper stop fixedly immobilizes a magnetic susceptible material to the stem;

where there is sufficient magnetic attraction between the float and the magnetic susceptible material to support the weight of the float;

where said magnetic portion is sufficient to continuously actuate the magnetically actuated switch; and wherein the magnetically actuated switch is reset by moving the float to the non-actuation sectional length of the stem.

* * * * *